Oct. 16, 1928.
C. S. GORDON ET AL
REDUCTION OF ATTENUATION DUE TO THE CONDUCTANCE
LOSSES IN CROSS ARMS AND INSULATOR PINS
Filed July 1, 1925   2 Sheets-Sheet 2
1,687,556
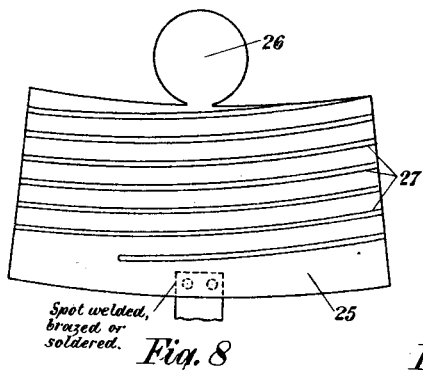
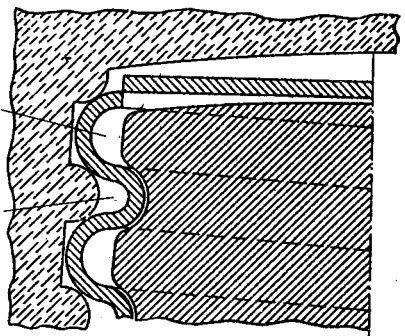
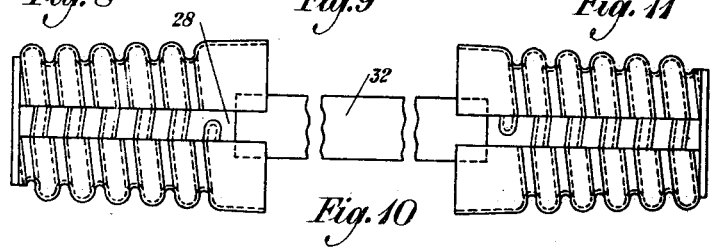
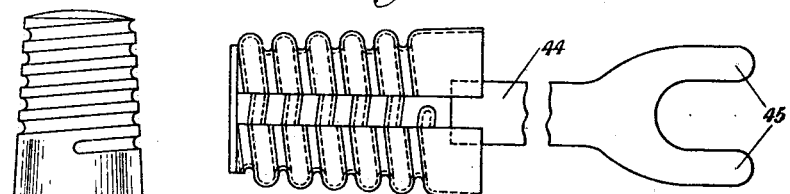
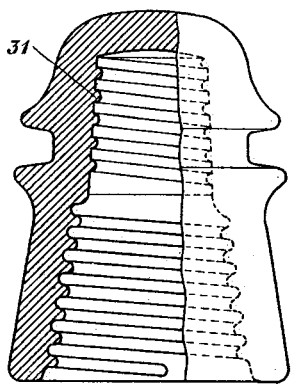
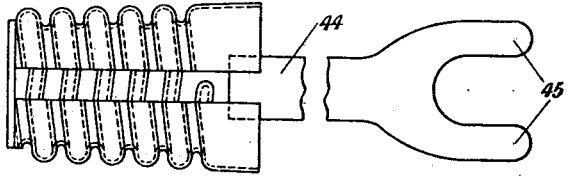
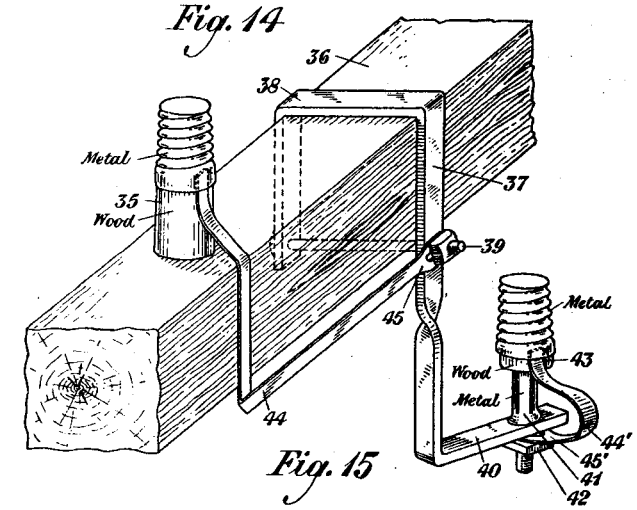
INVENTORS
C. S. Gordon & J. T. Lowe
BY
ATTORNEY Patented Oct. 16, 1928.

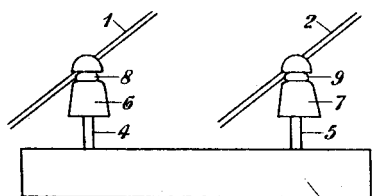
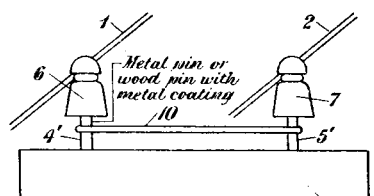
Fig. 1  Fig. 3
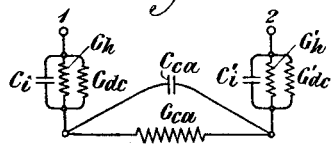
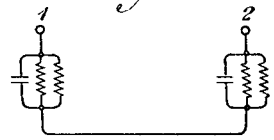
Fig. 2  Fig. 4
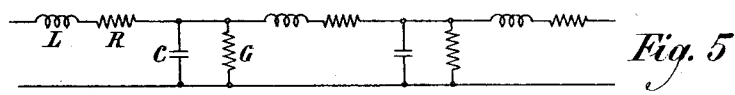
Fig. 5
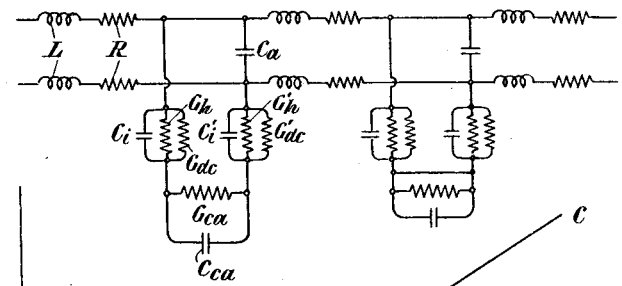
Fig. 6
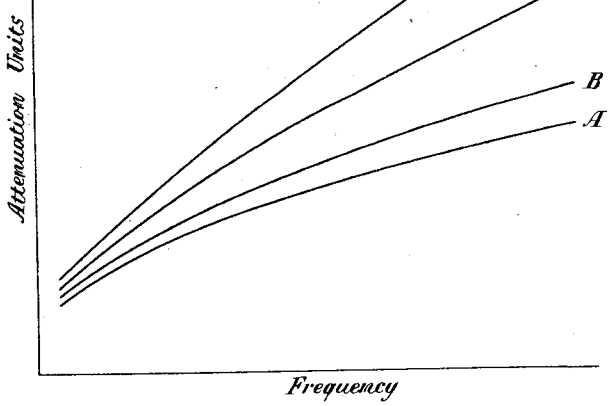
Fig. 7

1,687,556

UNITED STATES PATENT OFFICE.

CHESTER S. GORDON, OF NEW YORK, N. Y., AND JAMES T. LOWE, OF NEWARK, NEW JERSEY, ASSIGNORS TO AMERICAN TELEPHONE AND TELEGRAPH COMPANY, A CORPORATION OF NEW YORK.

REDUCTION OF ATTENUATION DUE TO THE CONDUCTANCE LOSSES IN CROSS ARMS AND INSULATOR PINS.

Application filed July 1, 1925. Serial No. 40,895.

This invention relates to transmission circuits, and more particularly to means for and methods of reducing the transmission loss in such circuits.

With the development of methods of transmitting telephonic and telegraphic signals by means of carrier currents propagated along open wire lines, new transmission problems have been introduced. Owing to the fact that the carrier currents employed are relatively high in frequency as compared with the voice currents or Morse currents utilized in the ordinary methods of communication, it has been found that the attenuation is very markedly increased, so much so, in fact, that repeaters for amplifying the transmitted currents must be separated by much shorter distances, thereby adding to the expense of the plant outside the terminal stations at which the carrier apparatus is applied. Furthermore, the attenuation is so great that it has been impractical to employ on telephone lines carrier frequencies much above 30,000 cycles per second.

An analysis of the factors producing this attenuation shows that there are three principal factors entering into it,—first, the A. C. resistance of the line conductors themselves, which increases with frequency because of the skin effect; second, a leakage loss in the insulators employed; and, third, an additional leakage loss in the cross-arms and pins carrying the insulators.

At present there are no practical methods of eliminating the losses due to the first of these factors, as this loss appears to be inherent in the conductor itself as now constructed. The losses due to the second of these factors, sometimes referred to as the hysteresis losses in the material of the insulator, may be to a large extent overcome by certain improved methods of insulator construction which form no part of the present invention. The third factor may be eliminated by short-circuiting the cross-arms and insulator pins, that is, by connecting a conductor of substantially no resistance, from the inner surface of one insulator to the inner surface of a corresponding insulator. The object of the present invention is to provide a simple, economical and efficient means for establishing such connections.

The invention may now be more fully understood from the following description when read in connection with the accompanying drawing, in which Figure 1 illustrates the normal arrangement of the cross-arms and insulator pins of a transmission line; Fig. 2 is an equivalent electrical circuit for the arrangement of Fig. 1; Fig. 3 illustrates the manner in which the cross-arms and insulator pins may be short-circuited; Fig. 4 is an equivalent electrical circuit for the arrangement of Fig. 3; Figs. 5 and 6 are theoretical circuits illustrating the factors that enter into the propagation of alternating currents along transmission lines; Fig. 7 is a series of curves illustrating the reduction in transmission loss due to short-circuiting the cross-arms and insulator pins; Fig. 8 shows the form in which a piece of metal may be stamped out in the preliminary operation of constructing a metallic thimble to be placed over an insulator pin in carrying out the present invention; Fig. 9 is a cross-section of the elements shown in Fig. 8; Fig. 10 illustrates the two completed thimbles and the connecting conductor; Fig. 11 is a sectional view showing the formation of the threads of the thimble; Fig. 12 illustrates a typical insulator pin upon which the thimble is to be placed; Fig. 13 shows the insulator adapted to be mounted on the pin after the thimble is in position; Fig. 14 shows the thimble with a modified form of conducting strip adapted to be used in connection with cross-arms at which transpositions are made; and Fig. 15 is a perspective view showing how the short-circuiting connections are established at a transposition point.

Before describing the detailed structure by which insulator pins and cross-arms may be short-circuited in accordance with the present invention, a brief discussion of the causes of transmission loss in open-wire lines will be given. Referring to Fig. 1, which illustrates in simplified form a typical cross-arm arrangement such as is employed in connection with telephone lines, 1 and 2 designates a pair of conductors of a telephone line such as are commonly strung from pole to pole across the country in ordinary open-wire construction. The cross-arm 3 is usually a wooden bar having wooden pins 4 and 5 upon which are mounted insulators 6 and 7, usually of glass or other non-conductive material. The conductors 1 and 2 are secured to the insulators 6 and 7 by means of tie wires or conductors 8 and 9.

In order to understand how the losses arise from leakage through such a system as that above described it must be remembered that the wood comprising the cross-arm 3 and the pins 4 and 5 is not a perfect non-conductor but is in fact a relatively poor dielectric as compared with the glass of which the insulators 6 and 7 are composed. The cross-arm and the pins therefore act as a condenser with a shunt leakage path of high resistance. Furthermore the metal of the conductors 1 and 2 adjacent to the insulators and the metal of the tie wires 8 and 9 constitute a plate of a condenser of which the glass insulator itself is the dielectric and of which the wooden pin is the other plate. During wet weather conditions the outer plate of the condenser is in effect, considerably enlarged in area due to the wetting of the outer surface of the glass of the insulator, so that the leakage effects produced by the insulator are greatly augmented in wet weather.

The action of the insulator and its associated parts as a condenser involves three factors,—first, the capacity $C_1$ between its plates (that is, the capacity between the line conductor, tie wire and moisture, if any, on its outer surface, on the one hand, and the insulator pin, on the other hand); second, the conductance $G_{dc}$ representing the direct current leakage from the line conductor over the outer surface of the insulator and under its petticoat to the supporting pin. This direct current leakage does not vary with frequency, and, being a surface leakage, is, of course, worse in wet weather than in dry weather, but even at its worst represents a rather small element of the total transmission loss; third, the conductance $G_h$ which represents the dielectric hysteresis losses in the material of the insulator itself. This conductance is a function of the capacity of the insulator and increases with the frequency, so that at high frequencies it becomes a very material factor.

These elements entering into the action of the insulator are illustrated in diagrammatic form in Fig. 2. Over and above these factors there are two other factors with which the present invention is primarily concerned, namely, the equivalent capacity $C_{ca}$ of the cross-arm and pins, and the equivalent conductance $G_{ca}$, representing the sum of the true conductance between the inner surface of one insulator and that of the other, and an additional conductance representing the dielectric losses in the cross-arm and pins. These factors are also represented schematically in Fig. 2. In order to eliminate the equivalent conductance of the pins and the cross-arm, in accordance with the present invention the wooden pin is sheathed by a thimble of conductive material and the thimbles of corresponding insulators are directly connected together by a metallic conductor schematically represented at 10 in Fig. 3, said conductor being of substantially zero resistance, so that practically a dead short-circuit connection exists between the inner surface of the insulator 6 and the inner surface of the insulator 7. The resultant equivalent electrical circuit is illustrated diagrammatically in Fig. 4.

The present invention thus far in the description has been limited to a circuit of a single pair of wires. It is obviously applicable to circuits consisting of several wires. For example, the common phantom circuit employs two wires in each side of the circuit. For such a circuit the metallic pins in one case or the metallic sheaths in the other case are all joined by a metallic conductor so that a substantially short circuit connection exists between the inner surface of all insulators of the one side of the circuit and the inner surface of all insulators of the other side.

In order to understand how this construction results in reducing the leakage loss, involving, as it does, an arrangement which at first thought would seem to provide a better leakage path than the original construction, a brief discussion of the theory of transmission will now be considered. Referring to Fig. 5, any transmission system of the usual type herein discussed may be thought of as a line made up of a large number of sections, each section comprising series inductance L, due to the material of the line wires themselves, series resistance R, which is also inherent in the material of the line wires themselves; a shunt capacity C, and a shunt conductance G. The propagation constant of such a conductive system may be expressed by the well-known formula:

$$y = \sqrt{(R+jL\omega)(G+jC\omega)} = \alpha + j\beta$$

in which $y$ is the propagation constant per unit length, and R, L, G and C are, respectively, the resistance, inductance, conductance, and capacity per unit length. $\omega$ is $2\pi$ times the frequency; $j$ is the operator $\sqrt{-1}$; $\alpha$ is the attenuation constant per unit length, and $\beta$ is a term representing a mere change in the phase of the current transmitted. Now the value of $\alpha$ in the above equation is given by the expression:

$$\alpha = \sqrt{1/2\sqrt{(R^2+L^2\omega^2)(G^2+C^2\omega^2)} + \frac{RG-LC\omega^2}{2}}$$

When $L^2\omega^2$ is large compared to $R^2$, and $C^2\omega^2$ is large compared with $G^2$, which is the case for the frequencies employed for carrier transmission, the expression reduces to:

$$\alpha = R/2\sqrt{C/L} + G/2\sqrt{L/C}$$

It therefore follows that any reduction of either the resistance R or the conductance G will result in a decrease in the attenuation of the circuit.

As has already been stated, the resistance R, being an inherent characteristic of the line conductors themselves, cannot be eliminated by any practical physical means. It is, however, possible to effect a very large reduction in the conductance G.

In order to apply the theoretical considerations just disclosed to the practical problem presented in the case of open-wire lines carried upon poles, let us refer to the diagram of Fig. 6 which shows the electrical equivalent of an open-wire line whose conductors are mounted upon glass insulators which are in turn mounted upon pins carried by cross-arms. The capacity C of Fig. 5 is now represented by the capacity $C_a$ due to the air acting as a dielectric between the line conductors, and the capacities $C_1$ and $C_1'$ which correspond to the capacities due to the action of an insulator as a condenser, as already described. The action of the air as a dielectric involves no leakage loss, or, at any rate, the leakage loss is so small that it may be neglected. The capacities $C_1$ and $C_1'$, however, have associated with them dielectric losses represented by the conductances $G_h$ and $G_h'$. Likewise, the conductances $G_{dc}$ and $G_{dc}'$ are associated with these capacities, but these conductances represent direct current leakage only and are of relatively small value. As already stated, however, all of the conductances associated with the capacities $C_1$ and $C_1'$ may be very greatly reduced by suitable methods of insulator construction. There remains, however, the conductance $G_{ca}$ which represents the losses in the wooden insulator pins and the cross-arm. If this conductance is short-circuited, and thereby eliminated from the circuit, the conductance G of Fig. 5 is proportionately reduced, and, as will be apparent from the equations above given, this reduction in the value of G results in a decrease of the energy loss.

A demonstration of this fact may be given as follows: Assume for the moment that the conductances associated with the insulators are zero, a condition which, as already noted, can be approximated in practice. For this condition it is clear that the current flowing through the conductance $G_{ca}$ will produce an energy loss which, of course, must be subtracted from the energy transmitted along the circuit. If this conductance is short-circuited, however, the current flowing between wires is a pure capacity current which produces no loss. In this connection it may be noted that the result which applicant attains by short-circuiting the pins and cross-arm could theoretically be obtained by making their equivalent conductance zero, but it is impossible to realize this condition in practice.

An idea of the magnitude of the reduction in leakage loss thus effected may be obtained from consideration of the curves of Fig. 7. These curves represent the attenuation at different frequencies of a transmission line, each of the curves representing a different condition of the circuit. The curve A, for example, represents the variation of attenuation with frequency where the transmission line involves series resistance R (the skin effect), series inductance L, and shunt capacity C, but no leakage conductance G. It will be observed that the attenuation increases as the frequency becomes higher, and this is due to the fact that the series resistance R is involved. If there were no series resistance, the attenuation would be uniform at all frequencies.

Curve B represents the variation in attenuation with frequency, as observed in an actual transmission line under dry weather conditions. Here, of course, we have leakage conductance G due to the hysteresis loss in the insulators and due to the leakage through the cross-arm and pins. Curve C is a similar curve for the same circuit under wet weather conditions. It will be observed that the attenuation has now been enormously increased, due primarily to the wetting of the surface of the insulators, thereby increasing the capacity with a consequent increase of the dielectric losses represented by $G_h$ and $G_h'$ of Fig. 6.

Unfortunately, the plant must be engineered for the wet weather condition when the attenuation is enormously increased. Not only must the circuit be so arranged that the transmission will be commercial under this condition, but special arrangements must be provided for maintaining the transmission constant under all weather conditions. It becomes obvious, therefore, that if the enormous loss represented by the curve C can be eliminated, or even substantially eliminated so that we have a condition approaching the curve A, an immense saving in the plant will be effected not only by reason of the reduction in the number of repeaters necessary, but also by reason of the fact that transmission regulators for maintaining the transmission constant under different weather conditions will not be necessary.

The curve D represents the variation of the attenuation with frequency under wet weather conditions where the pins and cross-arms have been short-circuited. It will be observed that the transmission loss due to the conductance G of Fig. 5 has been reduced to almost half its original value. The variation of the loss in pin and cross-arms due to changing weather conditions has likewise been eliminated. It will be understood, of course, that the loss may be further reduced by certain methods of insulator design which form no part of the present invention and need not be discussed herein.

In existing line construction, where wooden insulator pins are employed, the pins and cross-arms may be short-circuited by metallic thimbles tied together in pairs by a metallic conductor, as shown in Fig. 10, the thimbles being adapted to be slipped over the insulator pins, and the insulators then screwed into position. The thimble may be formed by stamping it out of metal in the shape shown in Fig. 8, the main body of the thimble being stamped in the general form of a trapezoid, as shown at 25, with a circular member 26 integrally connected thereto at the upper margin to form the top of the thimble. Corrugations 27 are formed in the material, as shown in Figs. 8 and 9, so that when the two side edges of the member 25 are brought into juxtaposition and the top member 26 bent down, as shown in Fig. 10, a screw-threaded thimble is formed which is, in effect, slotted along one side, as indicated at 28, so that the thimble may be mounted upon the insulator pin by simply springing it over the top thereof without attempting to screw it into place.

Fig. 12 illustrates a standard form of wooden insulator pin which, it will be noted, is screw-threaded at the top so that an insulator may be screwed upon it. The screw threads are so shaped that each thread has a flat top and the grooved portion between adjacent threads is substantially semi-circular in the transverse section. In order to use the thimble of the present invention it is necessary to so shape the corrugations 27 of Fig. 8 as to form a thread which will co-operate with the threads in the supporting pin and also cooperate with similar threads on the interior of an insulator. The corrugations 27 are, therefore, not so formed as to follow the external configuration of the threads on the insulator pin but, on the contrary, the threads are so shaped that not only are the spaces between adjacent threads semi-circular in section but also the external surfaces of the threads themselves are also of semi-circular section. This is clearly indicated at 29 and 30 of Fig. 11.

With this arrangement the part of the metal of the thimble which forms the groove between adjacent threads conforms to the semi-circular groove between the threads on the insulator pin. On the other hand, the insulator itself is formed with an interior screw-thread, as indicated at 31 of Fig. 13, which is just the reverse of the type of thread shown upon the pin in Fig. 12, that is, the spaces between threads are flat and the surfaces of the threads themselves are semi-circular in section. If the internal thread of the insulator be made of slightly larger diameter than that of the standard insulator, it will be clear from Fig. 9 that the half-round threads of the insulator will ride between the half-round threads of the thimble, and the projecting half-round surfaces of the thimble will project into the flattened space between the adjacent threads of the insulator. This form of the thread in the thimble enables threads of the standard shape to be employed in both the pin and the insulator.

As shown in Fig. 10, the thimbles will be formed in pairs, the pairs being joined together by a conductive strip 32. The thimbles themselves may be of copper, gilding metal, commercial bronze, or other suitable conducting metal, and similarly the conducting strip 32 may be formed of any well-known conducting material, although an annealed copper with its surface tinned is found preferable for this purpose. The conducting strip may be attached to the thimbles by riveting, spot welding, soldering or the like.

In the use of the device shown in Fig. 10, where it is desired to short-circuit the crossarm and wooden pins of a particular pair of conductors, the old insulators will be removed from the pins and the thimbles shown in Fig. 10 will then be sprung over the threads of the wooden pins. New insulators, having their inner bore of enlarged diameter, will then be screwed into place. When the insulator is thus mounted it locks the thimbles upon the insulator pins and the thimbles, together with the conductor 32, effectively short-circuit both the wooden insulator pins and the cross-arm, so that a metallic conductor of substantially no resistance extends from the inner surface of one insulator to an adjacent insulator.

At transposition points a slightly different condition is encountered. As such points, the two insulator pins of a pair, instead of being arranged side by side on the cross-arm so that both pins are on the same horizontal plane, must be arranged so that one is above the other. This is necessary in order that a pair of conductors which starts out on the same horizontal plane from an adjacent pole may be translated into a vertical plane at the transposition point, that is, given a halftwist, the wires being given a further halftwist between the pole at which the transposition takes place and the next succeeding pole, so that they arrive at the succeeding pole again in a horizontal plane but fully transposed in position. In order to accomplish these transpositions the construction shown in Fig. 15 is employed, where 35 is a wooden pin mounted upon the cross-arm 36 in the usual manner. The corresponding pin is mounted upon a metal bracket 37 having a U-shaped member 38 which may be slipped over the cross-arm 36 and clamped thereto by means of a bolt 39. One leg of the U-shaped member is bent at right angles to form a step member 40 upon which is mounted a metallic pin 41, the metallic pin being clamped to the step member 40 by a nut 42. The pin 41 carries a wooden cob 43, upon which the insulator is to be screwed.

In view of the peculiar mounting of the insulator supporting pins just described, it is not practical to use two thimbles permanently connected together at transposition points and for such installations the type of thimble shown in Fig. 14 will be used. As will be apparent from Fig. 14, the thimble proper is identical in structure with that illustrated in Fig. 10 but, instead of being strapped through a conductor to another thimble, the thimble shown in Fig. 14 is provided with a special conductor strip 44 which terminates at its opposite end in a bifurcated portion 45. One thimble of the type shown in Fig. 14 will then be sprung over the wooden pin 35 and the conducting strip will then be suitably bent over the cross-arm so that the bifurcated portion 45 may be clamped to the bracket 37 by means of the nut on the bolt 39. Similarly, another thimble of the same type will be sprung over the wooden cob 43, and its conducting strip 44' will be bent into such form that the bifurcated portion 45' may be clamped under the nut 42 which holds the metallic pin 41 in place. The insulators are then screwed into place over the two thimbles. It will be seen that a low resistance connection is established from the inner surface of one insulator, through the conducting strip 44, the bracket 37, and thence through the conducting strip 44', to the other insulator. In practice, thimbles of the type shown in Fig. 14 would be provided with conducting strips of different lengths so that the equipment could be accommodated to the requirements of particular situations.

It will be obvious that the general principles herein disclosed may be embodied in many other organizations widely different from those illustrated without departing from the spirit of the invention as defined in the following claims.

What is claimed is:

1. In a pole line construction comprising a pair of conductors strung along on poles with cross-arms carrying insulators mounted upon pins, one of said conductors acting as a return for the other, means to short-circuit the conductance of the cross-arm and its insulator pins between the insulators of the two wires of the pair comprising conductive thimbles of non-magnetic material provided with screw threads to co-operate with the threads upon the pins, a conductive strip of non-magnetic material connected to each thimble for electrically connecting the thimble corresponding to one wire of the pair through a low resistance circuit to the thimble corresponding to the return wire of the pair, the insulators being screwed upon the screw threads of the thimbles.

2. In a pole line construction comprising a pair of conductors strung along on poles with cross-arms carrying insulators mounted upon pins, one of said conductors acting as a return for the other, means to short-circuit the conductance of the cross-arm and its insulator pins between the insulators of the two wires of the pair comprising conductive thimbles of non-magnetic material provided with screw threads to co-operate with the screw threads upon the pins, said thimbles being split at one side so that they may be sprung into position upon the threads of the supporting pins, and a conducting strip of non-magnetic material connected to each thimble for electrically connecting the thimble corresponding to one wire of the pair to the thimble corresponding to the return wire of the pair.

3. In a pole line construction comprising a pair of conductors strung along on poles with cross-arms carrying insulators mounted upon pins, one of said conductors acting as a return for the other, means to short-circuit the conductance of the cross-arm and its insulator pins between the insulators of the two wires of the pair comprising pairs of conductive thimbles, the thimbles of non-magnetic material of each pair being screw-threaded to co-operate with the screw threads upon the supporting pins and each thimble being split at one side so that it may be sprung into position with its threads in engagement with the threads of the supporting pins, the thimbles being connected together in pairs through a conductive strip of non-magnetic material whereby when a pair of thimbles is mounted upon a pair of pins and the insulators screwed upon the thimbles, a low resistance connection will be established from the interior surface of the insulator supporting one wire of the pair to the interior surface of the insulator supporting the return wire of the pair.

4. A thimble to be mounted upon an insulator pin of a transmission line, said thimble being formed of a blank having a single main body in the form of a trapezoid and a circular projection at the top to form a cap, corrugations formed in the main body so that when the side edges of the main body are brought into juxtaposition the corrugations form threads in a split thimble-shaped member, the threads being of such pitch as to co-operate with the threads upon the insulator pin.

5. A thimble to be mounted upon an insulator pin of a transmission line, said thimble being formed of a blank having a main body in the form of a trapezoid and a circular projection at the top to form a cap, corrugations formed in the main body so that when the side edges of the main body are brought into juxtaposition the corrugations form threads in a split thimble-shaped member, the threads being of such pitch as to co-operate with the threads upon the insulator pin and also being so formed as to lock the thimble in position upon the insulator supporting pin when an insulator is screwed over the thimble.

6. An insulator mounting for a transmission line comprising a supporting pin upon a cross-arm, said supporting pin having screw threads upon which an insulator may be mounted, said screw threads having flat outer surfaces with grooves between adjacent threads of substantially half-round section, a metallic thimble adapted to be mounted on the supporting pin, said thimble having threads formed therein whose externally projecting surfaces are half-round in section and whose internally projecting surfaces are also half-round in section to co-operate with the half-round sections between the threads on the supporting pin, and an insulator provided with internal, half-round screw threads to mate with the external screw threads upon the supporting pin, said screw threads being of somewhat larger diameter so that the insulator may be screwed upon the outside of the thimble with the internal half-round threads engaging between the external half-round threads upon the thimble.

In testimony whereof, we have signed our names to this specification this 25th day of June, 1925.

CHESTER S. GORDON.
JAMES T. LOWE.